June 16, 1936.    R. HALL    2,044,430

EXPANSION JOINT

Filed June 4, 1935

Inventor
Robert Hall,
By Edmund H. Parry Jr.
Attorney

Patented June 16, 1936

2,044,430

UNITED STATES PATENT OFFICE 2,044,430

EXPANSION JOINT

Robert Hall, Lockport, N. Y., assignor to American District Steam Company, North Tonawanda, N. Y., a corporation of New York Application June 4, 1935, Serial No. 24,962

7 Claims. (Cl. 285—162)

This invention relates to expansion joints employed in pipe lines to take care of expansion and contraction under variations in temperature and pertains particularly to joints employing a tubular sealing member made to include a succession of flexible annular U-shaped areas or sections. Such a joint, and one to which the present invention is particularly applicable, forms the subject-matter of my prior Patent No. 1,992,612, issued February 26th, 1935. Therein all the U-shaped annuli are similarly disposed in side by side abutting relation and facing on the side of the tubular member which is exposed to line pressure from within the joint.

Due to variation in thickness and strength of the metal, and possibly also due to other causes, the tubular sealing member often tends to expand and contract to a different degree at different longitudinal parts resulting in overflexing in one or more of the annular U-shaped areas and underflexing in the others. Stresses and strains will be concentrated at the weakest point and eventually will cause rupture of the sealing member and a breakdown of the joint as a whole.

The principal object of the present invention is to effect uniform expansion and compression of the tubular sealing member throughout its length by controlling and equalizing the flexing of the different annular areas so that under no conditions can one or more either expand or contract to a greater degree than the rest, and to provide a novel and effective arrangement to accomplish this purpose.

A further object of the invention is to provide a dual arrangement for locally controlling the flexing of the individual annular areas and for independently limiting the over-all expansion and contraction of the tubular member.

Figure 1:
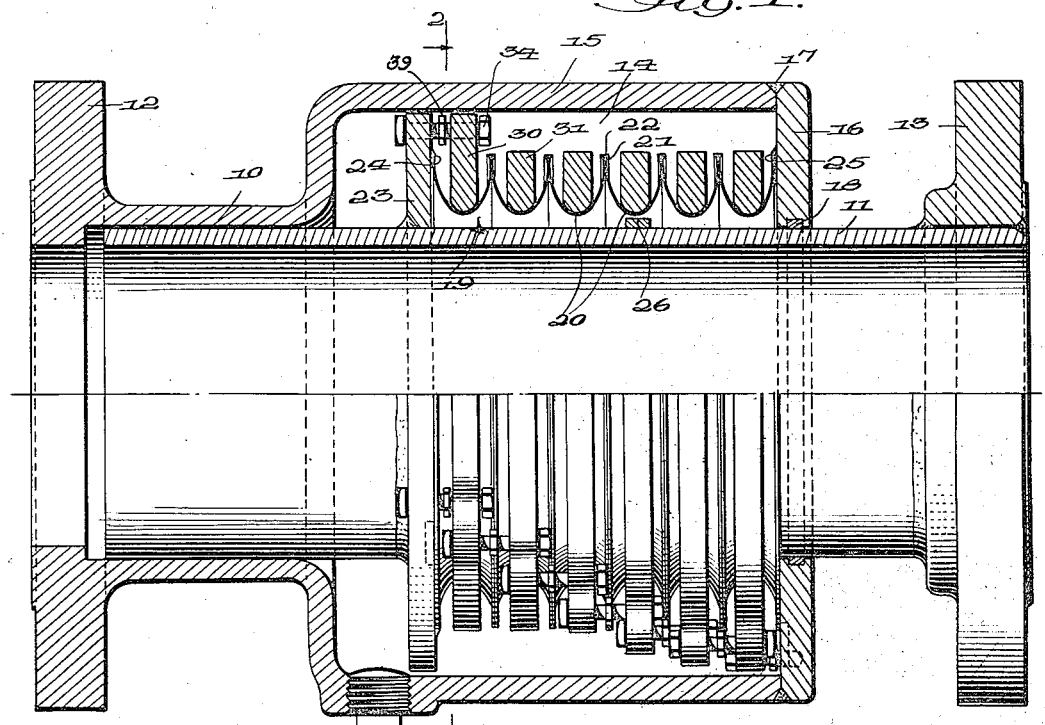
Figure 2:
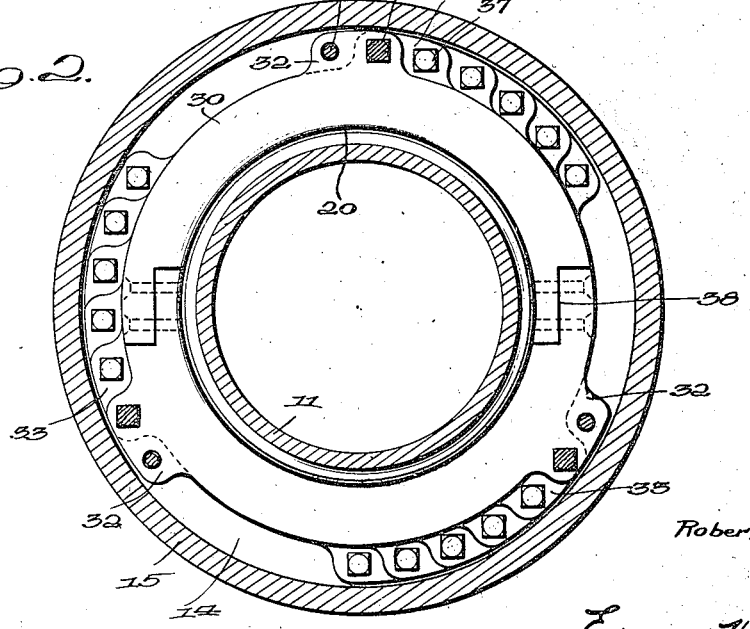

In the accompanying drawing:

Fig. 1 is a longitudinal view in sectional elevation of an expansion joint employing the present invention; and Fig. 2 is a transverse section taken on the line 2—2 of Fig. 1.

The joint shown is of the general construction disclosed and fully described in Patent No. 1,962,612, above mentioned. It may be here said that the peculiar form of the sealing member thereof renders the same far less likely to break down than the more conventional corrugated type member, but the improvement of the present invention further enhances the life and improves operation of such sealing member.

The main construction includes a pair of aligned relatively movable joint members 10 and 11, preferably telescoping each other, and respectively provided with outer end flanges 12 and 13 for connecting the joint between sections of a pipe line. An annular chamber 14 is provided by an enlargement 15 in the outer joint member 10, such chamber being closed at its open end by a plate 16 which may be welded at point 17 or otherwise secured in place. The inner periphery of plate 16 may be recessed to receive a sealing ring 18 making bearing engagement with the inner joint member 11. The joint members will thus be supported at such end of the chamber 14 as well as at the opposite end and danger of the joint parts binding or becoming out of alignment is avoided. At the same time ring 18 acts as an auxiliary seal to prevent complete failure of the joint in the event of breakdown of the sealing member.

The tubular sealing member 19 is located in chamber 14 and comprises a succession of flexible U-shaped annular sections 20 in side by side abutting relation. These all face on the side of the member exposed to the internal pressure of the joint, which in the illustrated embodiment is the outside. As fully explained in my prior patent the various annular sections may be separately formed as rings and then assembled in series and secured together at the edges 21 of their abutting side walls by an annular weld 22. Secured to the inner joint member 11 within chamber 14 is a ring 23 to which one end of the flexible member is joined at 24 as by welding in a sealed connection, and the other end of the member is similarly secured at 25 to end plate 16.

The over-all expansion of the tubular sealing member 19 is limited by an internal abutment at the end of the outer joint member 10 which engages the telescoping end of the inner joint member 11 as the joint parts move inwardly. To limit over-all contraction of the tubular member a series of stops 26 are secured to the periphery of the inner joint member 11 which engage the end plate 16 when the joint member moves apart to the desired limit.

While the double stop arrangement associated with the joint members proper just referred to prevents over-expansion and over-compression of the member 19 as a whole, it is necessary to provide additional mechanism to limit and equalize flexing of the individual annular U-shaped sections 20 of the member.

As the essential part of the auxiliary mechanism, I employ a series of rigid traverse rings 30, 31, etc., each seating in the hollow face of one of the annular sections. Such rings are rounded to conform to and closely fit the curved ends of the flexible sections. While conforming generally to the contour of the sections the rings are thinner to allow limited compression of the sections under movement of the joint parts. The rings are formed in two parts for purposes of installation which are secured in a smooth lapped joint 38.

The control of both expansion and contraction of the sections of the tubular member is effected through such rings by a series of individual couplings between each successive two rings. It will be noted in Fig. 1 that chamber 14 is of sufficient size to provide an annular space beyond the periphery of the sealing member. The rings are extended into such space, the extension taking the form of three or more lugs equispaced around the ring circumference as seen in Fig. 2. Such lugs are fairly wide but need not be of appreciable height. Each of the lugs is provided with two longitudinally extending bores or holes transversely spaced from one another and the rings are arranged with the three series of lugs in continuous stepped relation with each lug partially overlapping the lugs of both the preceding and following rings. Thus, by joint reference to Figs. 1 and 2 it will be seen that half of lug 33 of ring 31 lies opposite lug 32 of the first ring and the other half of lug 33 lies opposite the lug of the third ring. The lug on every ring is thus offset in a rotative sense partially beyond the lug on the next ring and the complete series of lugs forms a stepped line running substantially spirally of the group of rings.

The stepped lug arrangement is such that the first hole of the lug of each ring is aligned with the second hole of the lug of the preceding ring. Each two successive rings are coupled together by independent connecting elements one of which extends through each aligned pair of lug holes. Such connecting elements can take the form of bolts with the usual head and nut which slidably engage the lugs.

In the drawing bolt 34 interconnects lug 32 of the first traverse ring 30 with end plate 23. Through the second hole of lug 32 and the first hole of lug 33 of the second ring 31 is a similar bolt 36. Similarly bolt 37 extends through the second hole of lug 33 and the aligned hole in the lug of the next ring, and so on through the ring series with the lug of the last ring coupled to end plate 16.

The head and nut of each bolt constitute end stops to limit separation of the two rings engaged thereby. To limit the movement of the rings towards each other spacer elements in the form of washers 39 are mounted on the bolts intermediate the rings. Such washers may be rigid on the bolts midway between the head and nut so as not only to provide a minimum spacing between rings under compression but to constitute with the head on the one hand and the nut on the other opposing end stops for each ring determining its maximum and minimum positions with relation to the next ring. The possible traverse of each of the two rings coupled by a particular bolt along the respective portions of the bolt will be equal, and since each ring is similarly coupled to the rings on both sides, no two rings can separate or converge any further than any other two rings.

The stepped relation of the lug series prevents the various connecting bolts from interfering with each other and at the same time enables each ring through one lug to be connected to the adjoining rings on both sides by the respective overlapping lug portions by an offset pair of bolts in a very simple and compact manner. The stepped arrangement is particularly important in connection with the tubular member shown where because of the adjoining relation of the like positioned annular sections the rings must be capable of coming quite close together.

Since the various rings seat in the successive annular sections of the tubular sealing member it will be evident that as the member expands each two rings will separate from each other. If and when the end stops are reached the rings will be at their maximum spacing, and through their engagement with their annular sections will prevent further expansion thereof. Similarly contraction of the tubular member will cause the rings to move together, with a possible minimum spacing determined by the thickness of spacer elements 39. Each individual flexible section can only be compressed to the thickness of its ring. The spacer elements may, however, be sufficiently thick to terminate contraction of each pair of rings before the sections have reached this point and in any event will be such that the opposing walls of adjacent annular sections will not be compressed together to the point where permanent distortion or breakage might occur. In any event the spacer elements will be at least as thick as the thickness of the adjoining walls of the adjacent sections.

If certain of the annular sections are weaker than the others they will always contract or expand first. The limit stops on the coupling bolts acting through the rings will allow the same to flex only to their safe limit after which any stress or strain will be carried by the bolts and the other sections of the tubular member will then take care of any further expansion or contraction.

It will be understood that I have shown the traverse rings and their lug and bolt couplings on the outer periphery of the tubular member only because the hollow faces of the various annular sections face in such direction. The arrangement can equally well be applied interiorly of the tubular member if all or part of the annuar U-shaped sections face inwardly.

I claim:

1. In an expansion joint, a tubular sealing member formed to include a series of annular U-shaped flexible portions to provide for longitudinal compression and expansion of said member, a series of rigid rings seating in the various U-shaped portions of the sealing member longitudinally movable towards and away from each other as the sealing member contracts and expands, lugs on the successive rings arranged in stepped partially overlapping relation with each other, and coupling bolts respectively connecting the lug on each ring to the overlapping lugs on the preceding and following rings arranged and adapted to allow limited longitudinal movement of the individual rings relative to each other and operating through the rings to control flexing movement of the various U-shaped portions of the tubular sealing member.

2. In an expansion joint, a tubular sealing member formed to include a series of annular U-shaped flexible portions to provide for longitudinal compression and expansion of said member, a series of rigid rings seating in the various U-shaped portions of the sealing member longitudinally movable towards and away from each other as the sealing member contracts and expands, lugs on the successive rings, a pair of circumferentially spaced similar holes through each lug, the lugs of the various rings being successively arranged in stepped relation with the first hole in each lug aligned with the second hole in the lug of the next adjacent ring, individual connecting elements extending through and slidable in the aligned lug holes of each two successive rings, and stops on the connecting elements to limit longitudinal movement of the rings relative to each other and operating through the rings to limit flexing of the various U-shaped portions of the tubular sealing member.

3. In an expansion joint, a tubular sealing member constituted as a series of successive U-shaped annular sections having their hollow faces all similarly disposed on one side of the member and with the edges of the walls of adjoining sections in abutting relation, rings seating in the various annular sections, lugs on the successive rings beyond the periphery of the tubular member, said lugs being arranged successively in stepped partially overlapping relation one lug to the next, spaced coupling elements flexibly connecting the lug on each ring with the overlapping portions of the lugs on the preceding and following rings, said coupling elements limiting longitudinal movement of the rings and operating therethrough to limit flexing of the individual U-shaped sections of the tubular sealing member.

4. In an expansion joint, a tubular sealing member constituted as a series of successive U-shaped annular sections having their hollow faces all similarly disposed on one side of the member and with the edges of the walls of adjoining sections in abutting relation, rings seating in the various annular sections, lugs on the successive rings beyond the periphery of the tubular member, said lugs being arranged successively in stepped partially overlapping relation one lug to the next, separate coupling elements slidably engaging the respective overlapping portions of each lug and the lugs of the rings on both sides thereof and permitting limited movement of the rings as the tubular member flexes, and stops on the connecting elements limiting movement of the rings both towards and away from each other and operating through the rings to limit both expansion and contraction of the individual U-shaped sections of the tubular sealing member.

5. In an expansion joint, a tubular sealing member formed to include a series of annular U-shaped flexible portions to provide for longitudinal compression and expansion of said member, a series of rigid rings seating in the various U-shaped portions of the sealing member and longitudinally movable towards and away from each other as the sealing member contracts and expands, aligned longitudinal bores in each successive two rings of the series beyond the periphery of the U-shaped flexible portions, a series of successive longitudinally extending bolts, each bolt extending through the aligned bores of and slidably connecting successive rings, and its following ring, and a stop on each bolt midway of its ends between one ring and its following ring stops on each bolt at opposite ends beyond the two rings engaged, the distance between the intermediate stop and the opposite end stops being the same, so that the several rings will move in fixed and equal paths along the respective portions of the bolt and provide limited and equalized flexing of the U-shaped sections of the flexible member.

6. In an expansion joint, a tubular sealing member formed to include a series of annular U-shaped flexible portions to provide for longitudinal compression and expansion of said member, a series of rigid rings seating in the various U-shaped portions of the sealing member and longitudinally movable towards and away from each other as the sealing member contracts and expands, a pair of circumferentially spaced aligned longitudinal bores in each successive two rings of the series beyond the periphery of the U-shaped flexible portions, the aligned bores of each ring and its following ring being circumferentially offset a short distance from the aligned bores in each said ring and its preceding ring, and the successive pairs of aligned bores being circumferentially offset in the same direction to form a continuous stepped series extending spirally of the successive rings, and connecting elements engaging each two rings through the aligned bores therein and limiting movement of the rings under flexing movement of the tubular sealing member.

7. In an expansion joint, a pair of aligned relatively movable joint members, a connecting tubular sealing member formed to include a series of annular U-shaped flexible portions to provide for longitudinal compression and expansion of said sealing member, stop means limiting the over-all compression and expansion of the sealing member together with further independent individual stop means between each successive two annular U-shaped portions of the sealing member for limiting and equalizing compression and expansion of said individual U-shaped annular portions of the sealing member.

ROBERT HALL.